US010981479B2

(12) United States Patent
Sia, Jr.

(10) Patent No.: US 10,981,479 B2
(45) Date of Patent: Apr. 20, 2021

(54) ARMREST ASSEMBLY FOR A VEHICLE DOOR AND DOOR ASSEMBLY AND VEHICLE INCLUDING SAME

(71) Applicant: Honda Motor Co., Ltd., Tokyo (JP)

(72) Inventor: Generoso T. Sia, Jr., Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 16/247,844

(22) Filed: Jan. 15, 2019

(65) Prior Publication Data
US 2020/0223339 A1    Jul. 16, 2020

(51) Int. Cl.
*B60N 3/02*     (2006.01)
*B60N 2/75*     (2018.01)
*B60R 13/02*    (2006.01)

(52) U.S. Cl.
CPC .............. *B60N 2/78* (2018.02); *B60N 3/026* (2013.01); *B60R 13/0243* (2013.01)

(58) Field of Classification Search
CPC .......... B60N 2/78; B60N 2/4235; B60N 2/77; B60N 2/753; B60N 2/783; B60N 2/42709; B60N 2/797; B60N 3/026
USPC ..... 296/153, 1.09, 146.7, 187.05, 98, 65.02, 296/37.8, 37.13, 152; 297/411.21, 411.2, 297/411.22, 115, 216.1, 217.3, 411.35, 297/411.45
See application file for complete search history.

(56) References Cited

U.S. PATENT DOCUMENTS

| 6,971,698 | B1 * | 12/2005 | King .................... B60R 7/046 |
| | | | 224/544 |
| 7,762,600 | B2 * | 7/2010 | Shiono ............... B60R 13/0243 |
| | | | 296/1.02 |
| 8,141,933 | B2 | 3/2012 | Nakamura |
| 9,156,387 | B2 * | 10/2015 | Jadhav ................... B60N 2/78 |
| 9,193,310 | B2 * | 11/2015 | Hinokio ............. B60R 13/0206 |
| 2002/0149222 | A1 * | 10/2002 | Heranney ............ B60N 2/763 |
| | | | 296/37.13 |

FOREIGN PATENT DOCUMENTS

| DE | 2353680 A1 | 5/1975 |
| DE | 10162096 A1 | 7/2003 |
| EP | 2479068 A1 | 7/2012 |

(Continued)

*Primary Examiner* — D Glenn Dayoan
*Assistant Examiner* — Sunsurraye Westbrook
(74) *Attorney, Agent, or Firm* — Kenealy Vaidya LLP (57) ABSTRACT

An armrest assembly for a vehicle door can include a panel and a cover panel. The panel can include an upper exterior surface, a pull pocket extending from and recessed below the upper exterior surface, a first engagement aperture in the pull pocket, a second engagement aperture in the pull pocket, and a switch spaced away from the pull pocket. The cover panel can include an exterior touch surface for an occupant to pull on the vehicle door. The cover panel can be in the pull pocket and expose the upper exterior surface of the panel. The cover panel can include a snap element engaging with the first engagement aperture, the snap element attached to the interior surface of the cover panel, and an attachment element engaging with the second engagement aperture, the attachment element attached to the interior surface of the cover panel.

20 Claims, 11 Drawing Sheets

(56) References Cited

FOREIGN PATENT DOCUMENTS

| JP | H0930307 A | 2/1997 |
| JP | H09109760 A | 4/1997 |
| JP | 5044206 B2 | 7/2012 |
| WO | 2011039458 A1 | 4/2011 |

\* cited by examiner

ARMREST ASSEMBLY FOR A VEHICLE DOOR AND DOOR ASSEMBLY AND VEHICLE INCLUDING SAME

BACKGROUND

Current technology includes various covers for door linings. In particular, it is known to provide a pull pocket body, defining an interior, and a cover element attached to the pull pocket body. The pull pocket, defining an interior, may be secured to the door, e.g. to a door lining. The cover element may be attached to the pull pocket body and may provide a finger grip feature.

However, known covers are lacking in various ways.

SUMMARY

Some embodiments of this disclosure are directed to an armrest assembly for an armrest of a vehicle door. The armrest assembly can include a panel and a cover panel. The panel can include an upper exterior surface, a pull pocket extending from and recessed below the upper exterior surface, a first engagement aperture in the pull pocket, a second engagement aperture in the pull pocket, and a switch spaced away from the pull pocket. The cover panel can possess a height and width to provide a touch surface of the armrest. The cover panel can include an interior surface and an exterior surface, the exterior surface providing the touch surface for an occupant to exert force on the vehicle door. The cover panel can be located in the pull pocket and can expose the upper exterior surface of the panel. The cover panel can further include a snap engaging with the first engagement aperture, the snap attached to the interior surface of the cover panel, and an attachment element engaging with the second engagement aperture, the attachment element attached to the interior surface of the cover panel.

Some embodiments of this disclosure are directed to a door assembly for a vehicle and configured to be disposed in an opening of the vehicle. The door assembly can include an inner door panel, an outer door panel connected to the inner panel, a panel connected to the inner door panel, and a cover panel. The panel can include an upper exterior surface, a pull pocket extending from and recessed below the upper exterior surface, a first engagement aperture in the pull pocket, a second engagement aperture in the pull pocket, and a switch spaced away from the pull pocket. The cover panel can possess a height and width to provide a touch surface of the armrest. The cover panel can include an interior surface and an exterior surface, the exterior surface providing the touch surface for an occupant to exert force on the vehicle door. The cover panel located in the pull pocket and can expose the upper exterior surface of the panel. The cover panel further can include a snap engaging with the first engagement aperture, the snap attached to the interior surface of the cover panel, and an attachment element engaging with the second engagement aperture, the attachment element attached to the interior surface of the cover panel.

Some embodiments of this disclosure are directed to a vehicle including a vehicle door and an armrest assembly. The vehicle door can be configured to selectively open and close an opening of the vehicle. The vehicle door can include an outer door panel, an inner door panel connected to the outer door panel, and a door lining connected to the inner door panel. The armrest assembly can be connected to and extend from the door lining. The armrest assembly can include a panel and a cover panel. The panel can include an upper exterior surface, a pull pocket extending from and recessed below the upper exterior surface, a first engagement aperture in the pull pocket, a second engagement aperture in the pull pocket, and a switch spaced away from the pull pocket. The cover panel can possess a height and width to provide a touch surface of the armrest. The cover panel can include an interior surface and an exterior surface, the exterior surface providing the touch surface for an occupant to exert force on the vehicle door. The cover panel can be located in the pull pocket and can expose the upper exterior surface of the panel. The cover panel further can include a snap engaging with the first engagement aperture, the snap attached to the interior surface of the cover panel, and an attachment element engaging with the second engagement aperture, the attachment element attached to the interior surface of the cover panel.

Further embodiments and features are described below.

BRIEF DESCRIPTION OF THE DRAWINGS

The disclosed subject matter of the present application will now be described in more detail with reference to exemplary embodiments of the apparatus and related methods, given by way of example, and with reference to the accompanying drawings, in which.

DETAILED DESCRIPTION OF EXEMPLARY EMBODIMENTS

A few inventive aspects of disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Known technology relating to covers for door linings is subject to various problems and disadvantages. In particular, covers for an interior of a pull pocket, in an armrest, for example, is subject to various problems and disadvantages. Such problems and disadvantages, for example, relate to the ease in which a cover may be applied to the interior of a pull pocket, in particular in view of the spatial constraints present in such a pull pocket. Such problems and disadvantages, for example, also relate to the stability and securement of a cover, while still providing for removal of the cover if needed. The present disclosure addresses these and other problems and disadvantages.

Figure 1:
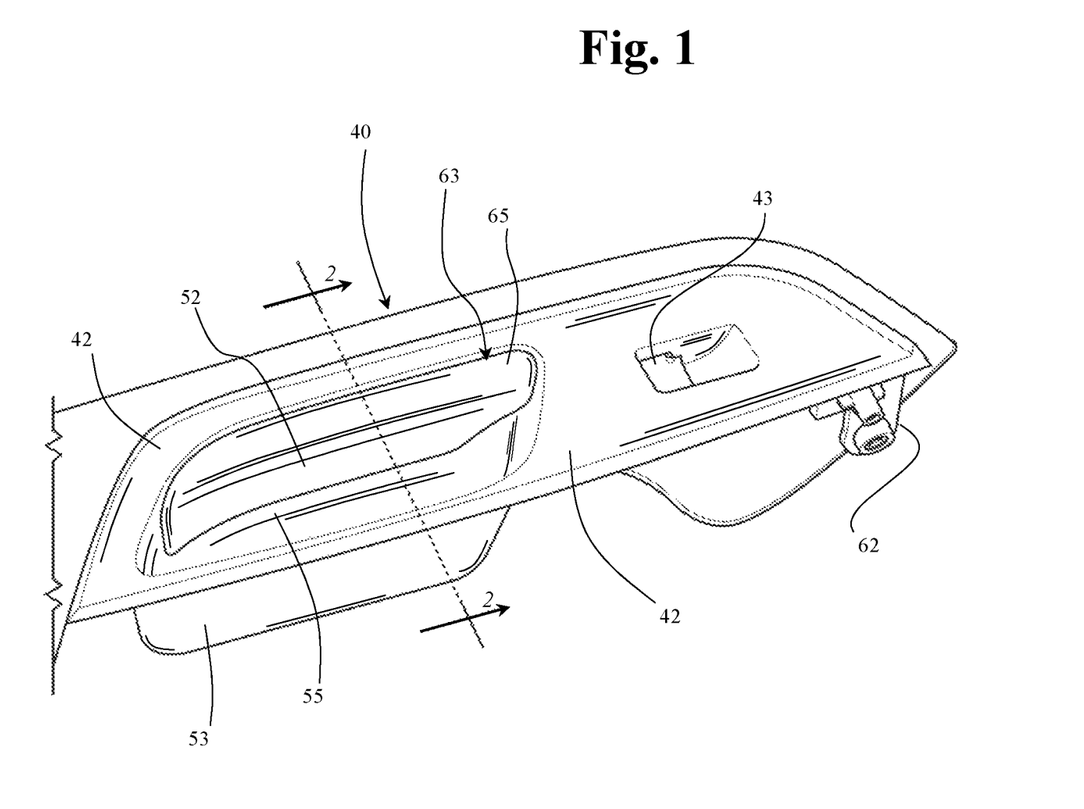
FIG. 1 is a perspective view of an armrest assembly with cover, in accordance with one or more embodiments of the disclosure.

FIG. 1 is a perspective view of an armrest assembly 40, in accordance with one or more embodiments of the disclosure. As shown, the armrest assembly 40 may include a panel 42. The panel 42 may extend along a length of the armrest assembly 40 and define an upper surface of the armrest assembly 40. The panel 42 may include switch 43 such that the panel 42 includes or constitutes a switch panel. The switch can be electrically connected to an actuator mounted in the vehicle door 20, 30. The switch may control a variety of devices. For example, the switch 43 may be electrically connected to an electric motor of a window regulator assembly that is configured to raise and lower a window of the vehicle door 20, 30. In another exemplary embodiment, the switch 43 may be electrically connected to a door lock mechanism that is configured to selectively lock and unlock the vehicle door 20, 30 when the vehicle door 20, 30 is in a closed position. In an alternate embodiment, the switch 43 can be omitted and the panel 42 can be modified so that the surface of the panel 42 is continuous where the switch 43 is shown in FIG. 1.

The panel 42 may include a pull pocket 52, as is shown in FIG. 1. The pull pocket 52 may include an outboard panel 53 and an inboard panel 55. The pull pocket 52 may also include a lower panel 54, described below. In accordance with at least one embodiment of the disclosure, a cover 63 with cover panel 65 is provided upon or adjacent to the inboard panel 55. Illustratively, such position of the cover panel 65 may provide for an effective "touch surface" to pull the door 20, 30 closed or otherwise manipulate the door 20, 30 by the occupant of the vehicle 10.

Figure 3:
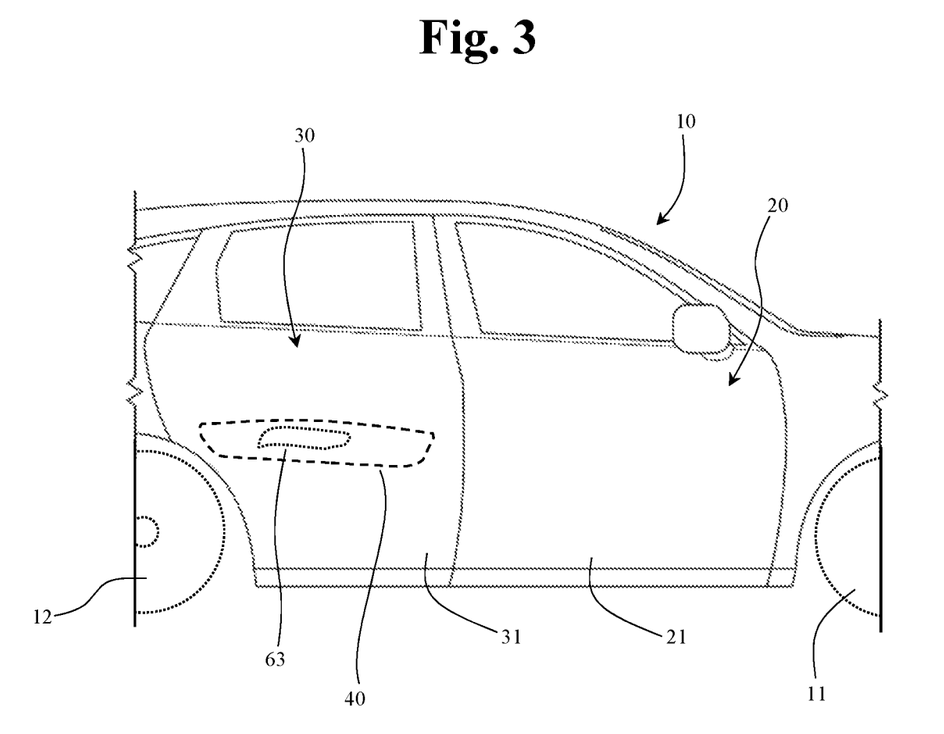
FIG. 3 is a side view showing a vehicle with cover, in accordance with one or more embodiments of the disclosure.
Figure 4:
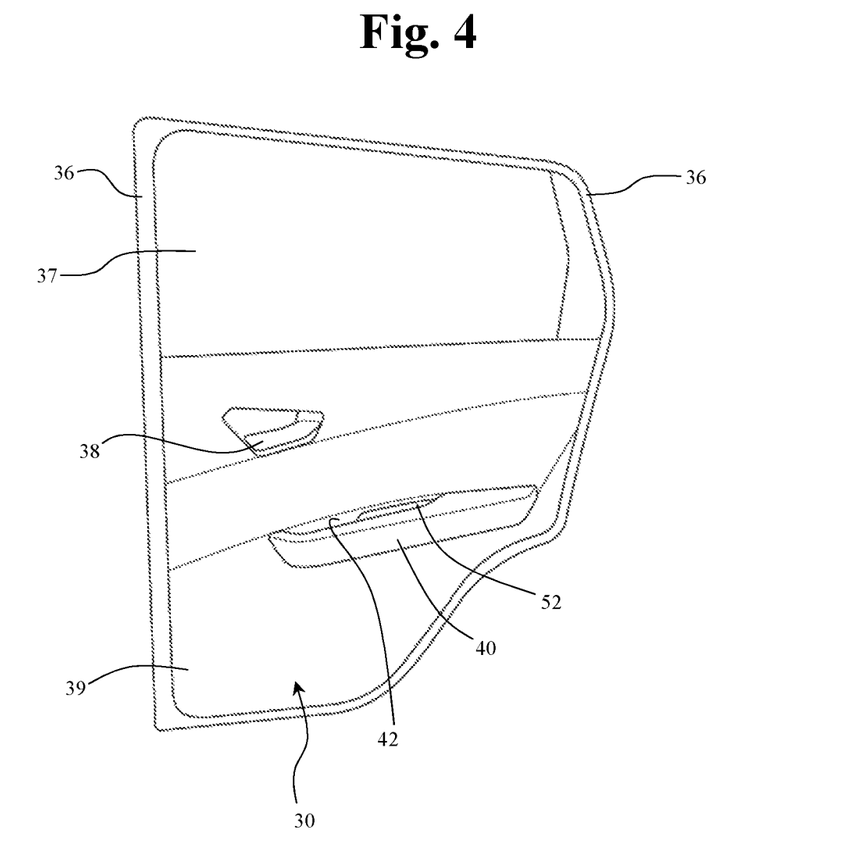
FIG. 4 is a side view showing a door with cover, in accordance with one or more embodiments of the disclosure.

Additionally, the armrest assembly 40 can include attachment element 62, as shown in FIG. 1. The attachment element 62 provides attachment to a supporting door panel in the door 20, 30 of the vehicle 10. It is appreciated that other attachment assemblies, mechanisms, or devices may be used in combination with the attachment element 62 so as to effectively attach the armrest assembly 40 to the door 20, 30 and/or the door lining 39 (also referred to as a door trim panel) of the vehicle 10, as shown in FIGS. 3 and 4. The armrest assembly 40, as shown in FIG. 1, may be attached to the passenger-side and/or to the driver-side of the particular vehicle 10, i.e. to either a front passenger-side door 20 or a rear passenger-side door 30 of FIG. 3, for example. As illustrated, with such arrangement, the switch 43 would be provided in front of the pull pocket 52.

Figure 2:
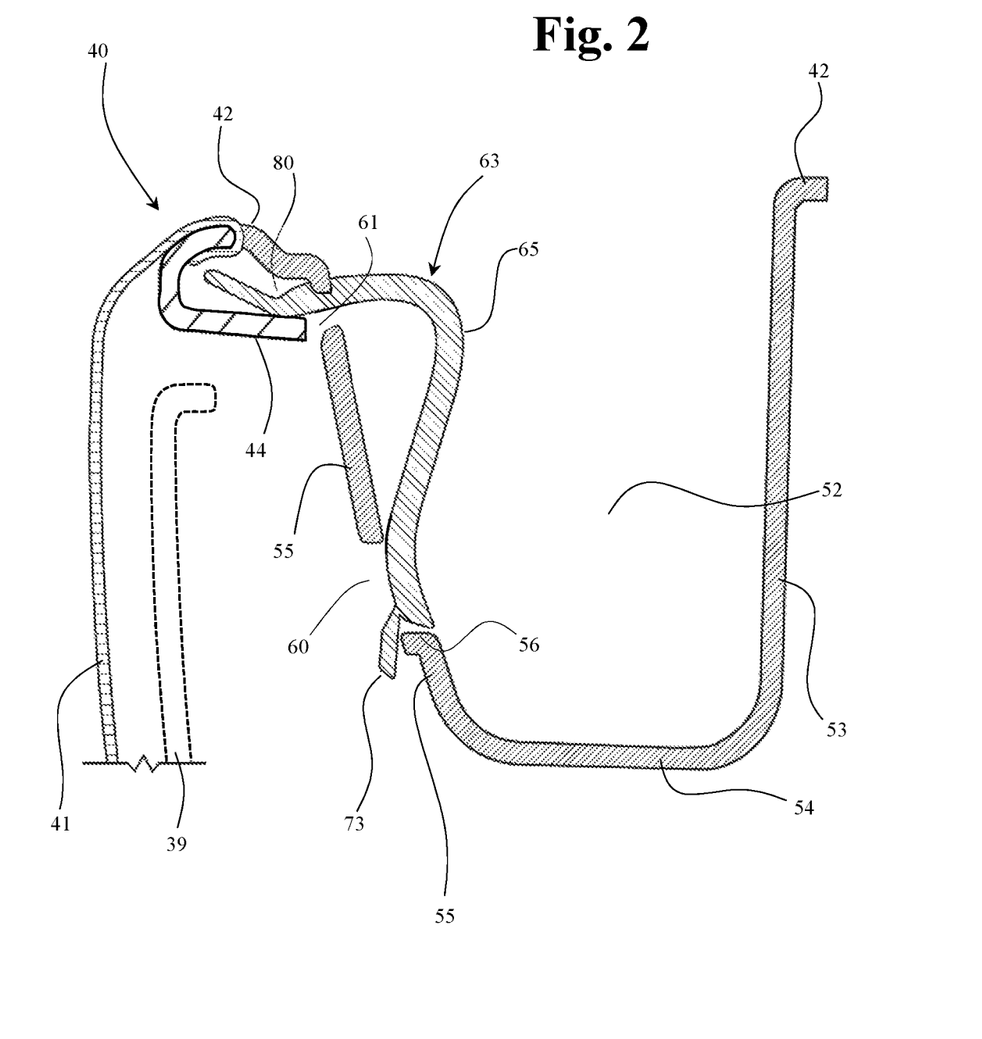
FIG. 2 is a cross-sectional schematic view, along lines 2-2 of FIG. 1, of an armrest assembly with a cover, in accordance with one or more embodiments of the disclosure.

Referring to FIGS. 1 and 2, in addition to finished/textured surfaces of panel 42 and the pull pocket 52, the armrest assembly 40 can further include a decorative panel 41 that is secured at one end to the panel 42. The decorative panel 41 can be a fabric panel, a leather panel, a wood panel, carbon fiber panel, etc.

FIG. 2 is a cross-sectional schematic view, along lines 2-2 of FIG. 1, of an armrest assembly 40 with a cover 63, in accordance with one or more embodiments of the disclosure. As shown in FIG. 3, the armrest assembly 40 is configured to be provided on the passenger-side of the vehicle 10, in accordance with one or more embodiments of the disclosure. It is of course appreciated that mirror image structure, to that described herein, may also be provided on the driver-side of the vehicle 10. FIG. 2 illustrates various features of the panel 42 to which the cover 63 is mounted. The armrest assembly 40, including the panel 42, may be attached or mounted to door lining 39 of the vehicle door 20, 30, as shown in FIG. 4. It is appreciated that any of a variety of mounting or attachment arrangements may be utilized to attach the armrest assembly 40 to the larger structure of the door 20, 30 and/or the door lining 39.

As described above, the panel 42 includes the pull pocket 52. The pull pocket 52 defines an interior space. The pull pocket 52, as described above, includes outboard panel 53 and inboard panel 55, as well as a lower panel 54. In accordance with one or more embodiments, the inboard panel 55 may include aperture(s), i.e. attachment aperture(s), 60, 61. As shown, the cover 63 attaches to the apertures 60, 61. More specifically, as described further below, one or more snaps may attach to the one or more apertures 60, 61.

FIG. 3 shows a vehicle 10 with the cover 63, in accordance with one or more embodiments of the disclosure. Accordingly, FIG. 3 illustrates an environment in which the cover 63, of the disclosure, may be utilized. It is appreciated that the cover 63 may be utilized in a wide variety of vehicles, and that the invention is not limited to the particular vehicle 10 shown in FIG. 3.

As shown, the vehicle 10 includes front wheel 11 and rear wheel 12. The vehicle 10 further includes a front passenger-side door 20 and a rear passenger-side door 30. The front passenger-side door 20 includes outer door panel 21. The rear passenger-side door 30 includes outer door panel 31. Accordingly, while FIG. 3 shows an exterior of the vehicle 10, including an exterior of the doors 20, 30, FIG. 4 (as described below) shows an interior of the rear passenger-side door 30. In particular, FIG. 3 shows disposition of armrest assembly 40 relative to the door 30 as well as relative to the overall vehicle 10. As is shown in FIG. 3, the cover 63 is provided to be attached to or be a part of the armrest assembly 40. The cover 63 of the disclosure may be provided on any door of a vehicle 10 as may be desired.

As referenced above, FIG. 4 is a side view showing door 30 with the cover 63, in accordance with one or more embodiments of the disclosure. More specifically, FIG. 4 shows rear passenger-side door 30. The door 30 includes an inner door panel 36, a window 37, a handle 38, and a door lining (or door trim panel) 39. The inner door panel 36 may be connected to the outer door panel 31 by any appropriate process or structure(s) such as but not limited to mechanical fasteners (rivets, threaded fasteners, clamps, etc., or any combination thereof), adhesive, welds, etc., or any combination thereof. The door lining 39 may be connected to the inner door panel 36 by any appropriate process or structure(s) such as but not limited to elastically expanding mechanical fasteners, threaded mechanical fasteners, adhesives, etc. Additionally, the door 30 includes armrest assembly 40. The armrest assembly 40 may include a panel 42. The panel 42 may include a pull pocket 52. The pull pocket 52 may be provided with cover 63, of the disclosure. It is appreciated that the arrangement shown in FIG. 4 is illustrative. The cover 63, of the disclosure, may be used in other arrangements, including other armrest assemblies and other pull pocket arrangements, and is not limited to the particular arrangement shown in FIG. 4.

Figure 5:
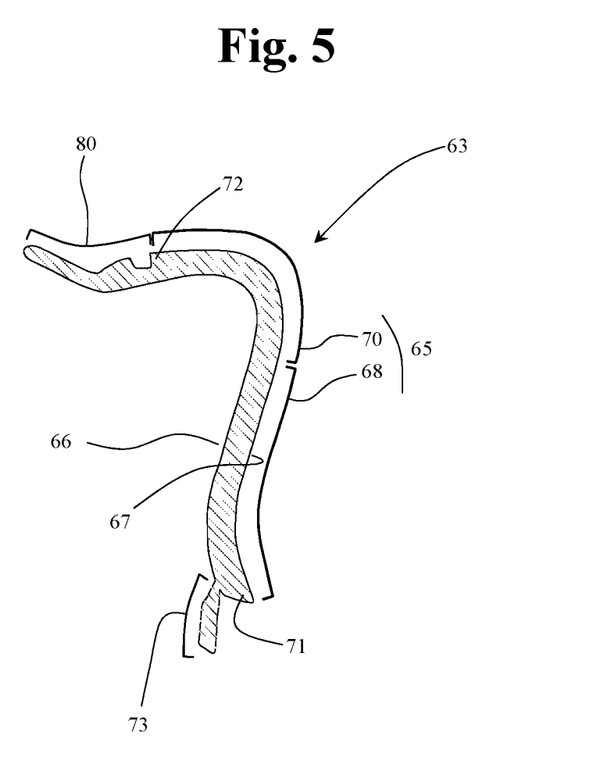
FIG. 5 is a cross-sectional schematic view of the cover of FIG. 2, providing further details of a cover panel of the cover, in accordance with one or more embodiments of the disclosure.

FIG. 5 is a cross-sectional schematic view of the cover 63 of FIG. 2, providing further details of the cover panel 65 of cover 63, in accordance with one or more embodiments of the disclosure. As shown, the cover 63 includes cover panel 65, attachment element 73, and snap 80. The attachment element 73 and the snap 80 serve to connect the cover panel 65 to the panel 42, and more specifically, to an inboard panel 55 of a pull pocket 52. The cover panel 65, as shown, includes a concave panel portion 68 and a convex panel portion 70. Such concavity/convexity is from the perspective of looking at an exterior surface 67 of the cover panel 65. That is, the cover panel 65 includes an exterior surface 67, as well as an interior surface 66. The exterior surface 67 may be a finished surface that is exposed to the occupant of the vehicle 10 such that the occupant may grab, touch or otherwise engage with the exterior surface 67 (so as to close the door 20, 30 of the vehicle 10, for example).

The cover panel 65 also includes a panel lower end or edge 71 and a panel upper end or edge 72. As shown, the snap 80 may extend from the panel upper end or edge 72 or from a portion of the cover panel 65 adjacent to the panel upper end 72. The attachment element 73 may extend from the panel lower end or edge 71 or from a portion of the cover panel 65 adjacent to the panel lower end 71.

Figure 6:
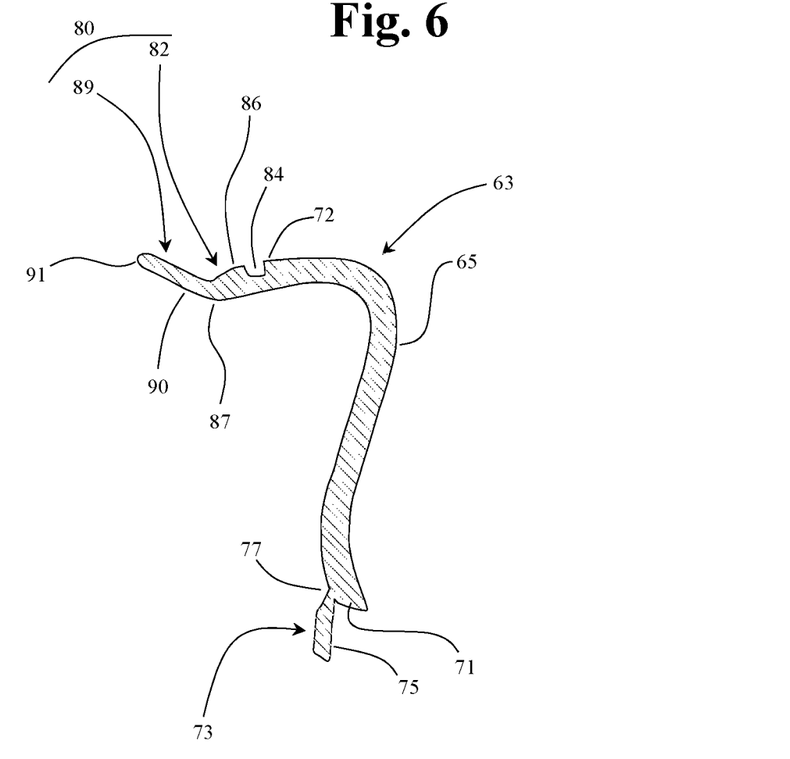
FIG. 6 is a cross-sectional schematic view of the cover of FIG. 2, providing further details of a snap of the cover, in accordance with one or more embodiments of the disclosure.

FIG. 6 is a cross-sectional schematic view of the cover 63 of FIG. 2, providing further details of a snap 80 of the cover 63, in accordance with one or more embodiments of the disclosure. The snap 80 may include a body portion 82 and a guide extension 89.

Figure 7:
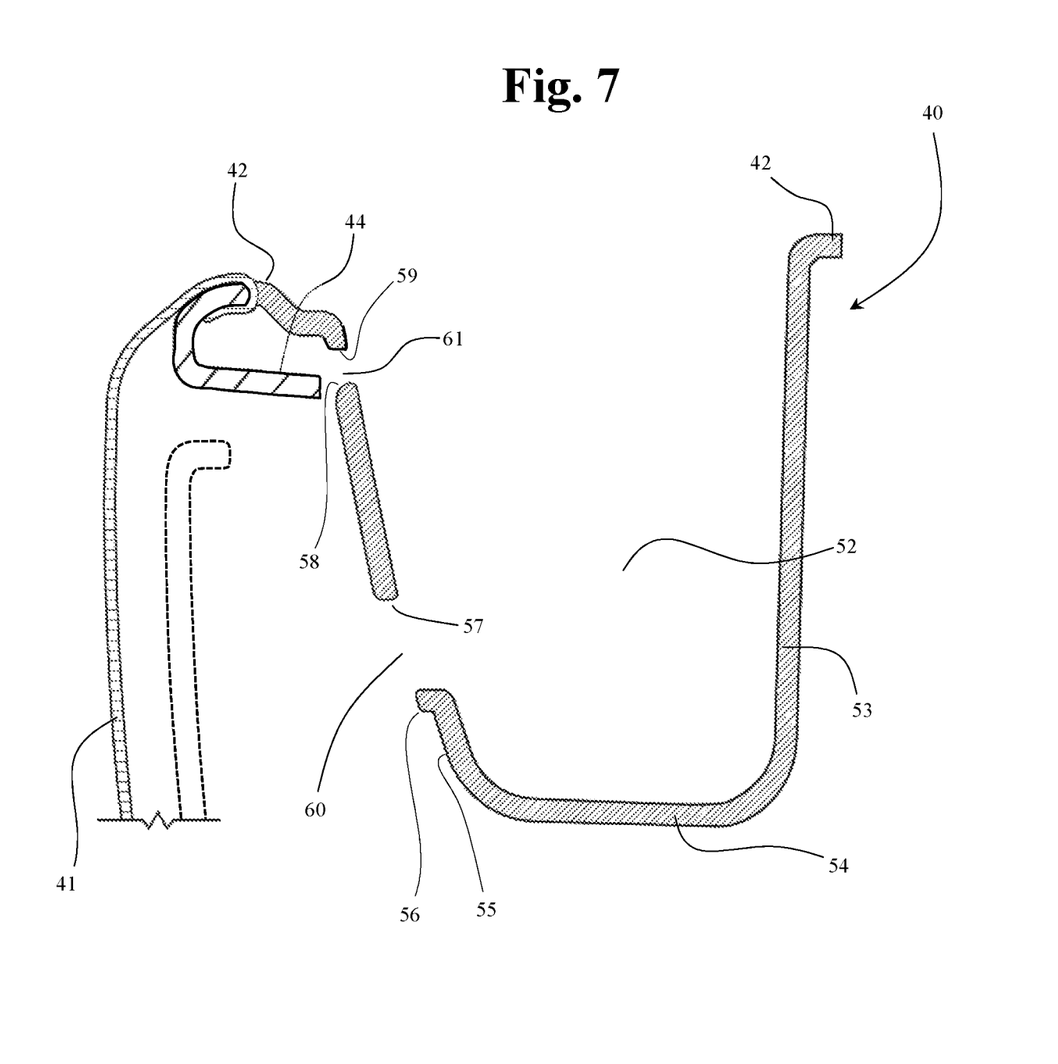
FIG. 7 is a cross-sectional schematic view of the armrest assembly of FIG. 2, providing further details of structure of the armrest assembly, which engages with cover, in accordance with one or more embodiments of the disclosure.

The body portion 82 may be integrally formed with the cover panel 65 or may be a separate piece attached to the cover panel 65 in some manner, such as utilizing heat bonding, adhesive, or other attachment technology. Relatedly, the guide extension 89 may be integrally formed with the body portion 82 or may be a separate piece attached to the body portion 82 in some manner, such as but not limited to utilizing heat bonding, adhesive, or other attachment technology. In accordance with at least one embodiment of the disclosure, the body portion 82 may be a bulbous structure that is interposed between the panel upper end or edge 72 and the guide extension 89. In the case that the snap is a flange, the bulbous shape may only be provided in the vertical direction as shown in FIG. 6, i.e. in that in the horizontal direction the flange extends along the top end or edge 72 of the cover panel 65. In the case of the snap is a prong or pin, the bulbous shape may be provided circumferentially around a circular circumference of the body portion 82. As shown, the body portion 82 includes a guide surface 86 and an engagement surface 87. Additionally, the body portion 82 includes an engagement channel 84. As described herein, the engagement channel 84 may be characterized as a "snap element" in that such engagement channel 84 "snaps" in place onto an edge of the inboard panel 55 that surrounds the upper aperture 61, as shown in FIG. 2 and FIG. 7, for example.

As shown in FIG. 6, the guide extension 89 includes a guide surface 90 and an end 91. As described below, in mounting of the cover 63 onto the panel 42, the guide surface 90 may engage with a panel securement flange 44.

As shown in FIG. 6, the attachment element 73 includes a connection portion 77. The attachment element 73 may be integrally formed with the cover panel 65, as illustrated in FIG. 6. Alternatively, the attachment element 73 may be formed separately from the cover panel 65 and connected or attached to the cover panel 65 such as but not limited to utilizing heat bonding, adhesive, or other attachment technology.

The attachment element 73 may include an engagement surface 75. The engagement surface 75 may engage with an edge or flange 56 of the inboard panel 55 both during mounting of the cover 63 (onto the panel 42) and in the completed arrangement, i.e. once the cover panel 65 is secured to the panel 42. In accordance with one or more embodiments, the edge or flange 56 may be "sandwiched" between the engagement surface 75 and the panel lower end 71. Accordingly, as shown in FIG. 2, for example, the geometry of the inboard panel 55 relative to the geometry of the cover 63 may serve to securely support and hold the cover 63 in position upon the panel 42. Further details are described below.

FIG. 7 is a cross-sectional schematic view of the armrest assembly 40 of FIG. 2, providing further details of structure of the armrest assembly 40, which engages with cover 63, in accordance with one or more embodiments.

Various features and components of the armrest assembly 40 are described above. In particular, the armrest assembly 40 includes panel 42. The panel 42 includes outboard panel 53, lower panel 54, and inboard panel 55. The panels 53, 54, and 55 collectively define a concave space of the pull pocket 52. As shown, the inboard panel 55 includes aperture 60 and aperture 61. Each of such apertures 60, 61 may be in the form of a slot or a hole, for example. The inboard panel 55 also includes an edge or flange 56, which defines a lower extent of the aperture 60. The inboard panel 55 also includes an edge 57. The edge 57 defines an upper extent of the aperture 60.

Additionally, the inboard panel 55 includes an edge or flange 59. The edge or flange 59 defines an upper extent of the aperture 61. As described above, the edge 59 engages with the engagement channel 84 (of the cover 63), in accordance with one or more embodiments of the disclosure. Additionally, the inboard panel 55 includes an edge 58. The edge 58 defines a lower extent of the aperture 61, as shown in FIG. 8, for example.

Figure 8:
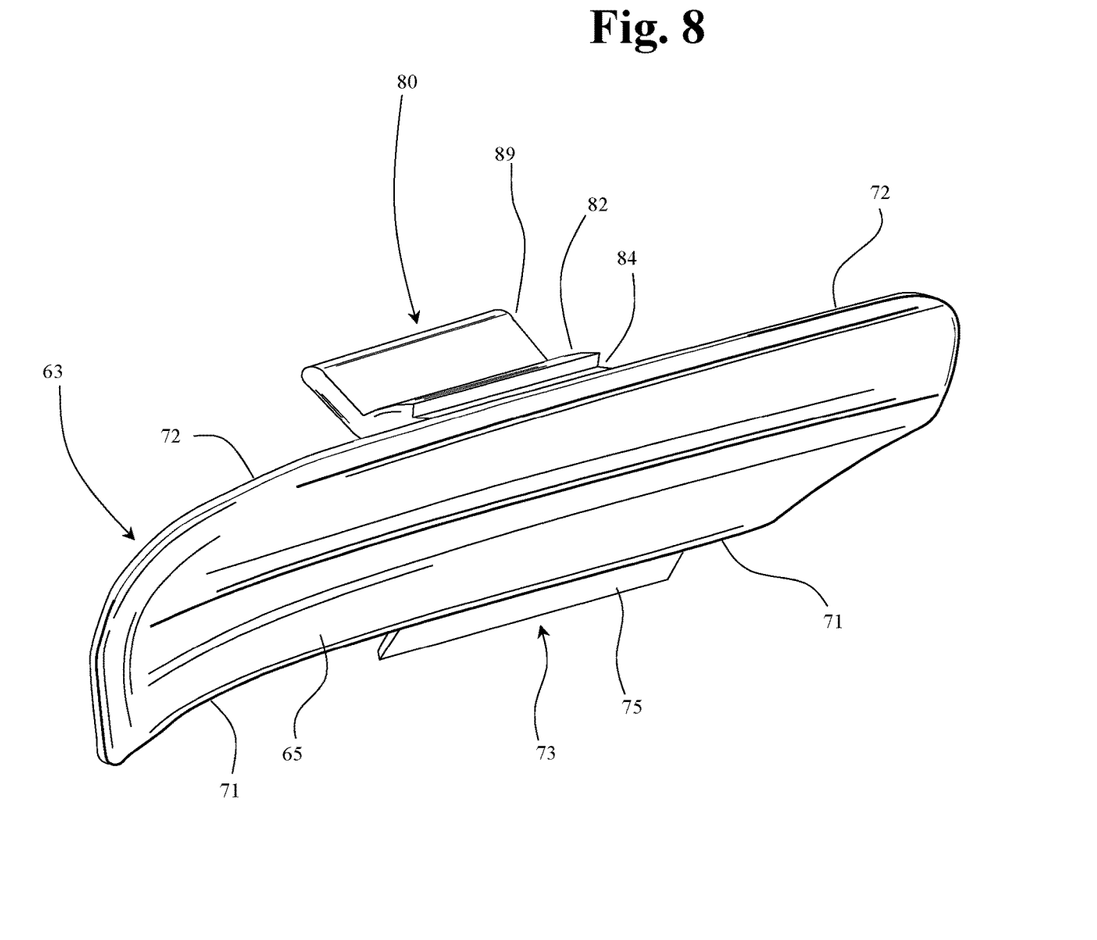
FIG. 8 is a perspective view of a cover, the same as or similar to the cover of FIG. 2, in accordance with one or more embodiments of the disclosure.

FIG. 8 is a perspective view of a cover 63, the same as or similar to the cover of FIG. 2, in accordance with one or more embodiments of the disclosure. FIG. 8 illustrates a cover 63 that includes a single snap 80 and a single attachment element 73. As shown, the snap 80 may be in the form of a flange or elongated structure that extends along an upper end or edge 72 of the cover panel 65. As shown, the attachment element 73 may be in the form of a flange or elongated structure that extends along a lower end or edge 71 of the cover panel 65.

Figure 9:
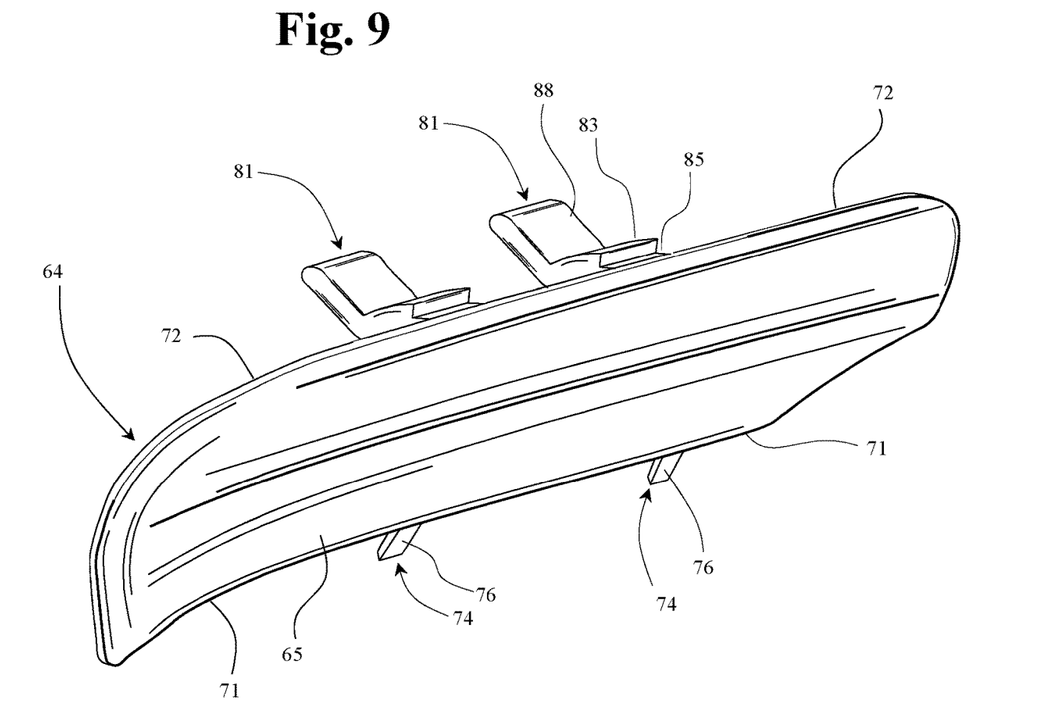
FIG. 9 is a perspective view of a second embodiment of a cover, in accordance with one or more embodiments of the disclosure.

FIG. 9 is a perspective view of a second embodiment of a cover 64, in accordance with one or more embodiments. FIG. 9 illustrates a cover 64 that includes a plurality of snaps 81 and a plurality of attachment elements 74.

As shown, each of the snaps 81 may be in the form of a short flange positioned at an upper end or edge 72 of the cover panel 65. Each snap 81 may include body portion 83 and guide extension 88, as well as engagement channel 85. Alternatively, instead of the flange structure shown in FIG. 9, each of the snaps 81 may be in the form of a prong (or similar structure) having a cylindrical outer surface, with engagement channel 85 cut across a top of such structure.

As shown, each of the attachment elements 74 may be in the form of a short flange positioned at a lower end or edge 71 of the cover panel 65. Each attachment element 74 may include an engagement surface 76. Alternatively, instead of the flange structure shown in FIG. 13, each of the attachment element 74 may be in the form of a prong (or similar structure) having a cylindrical outer surface.

Figure 10:
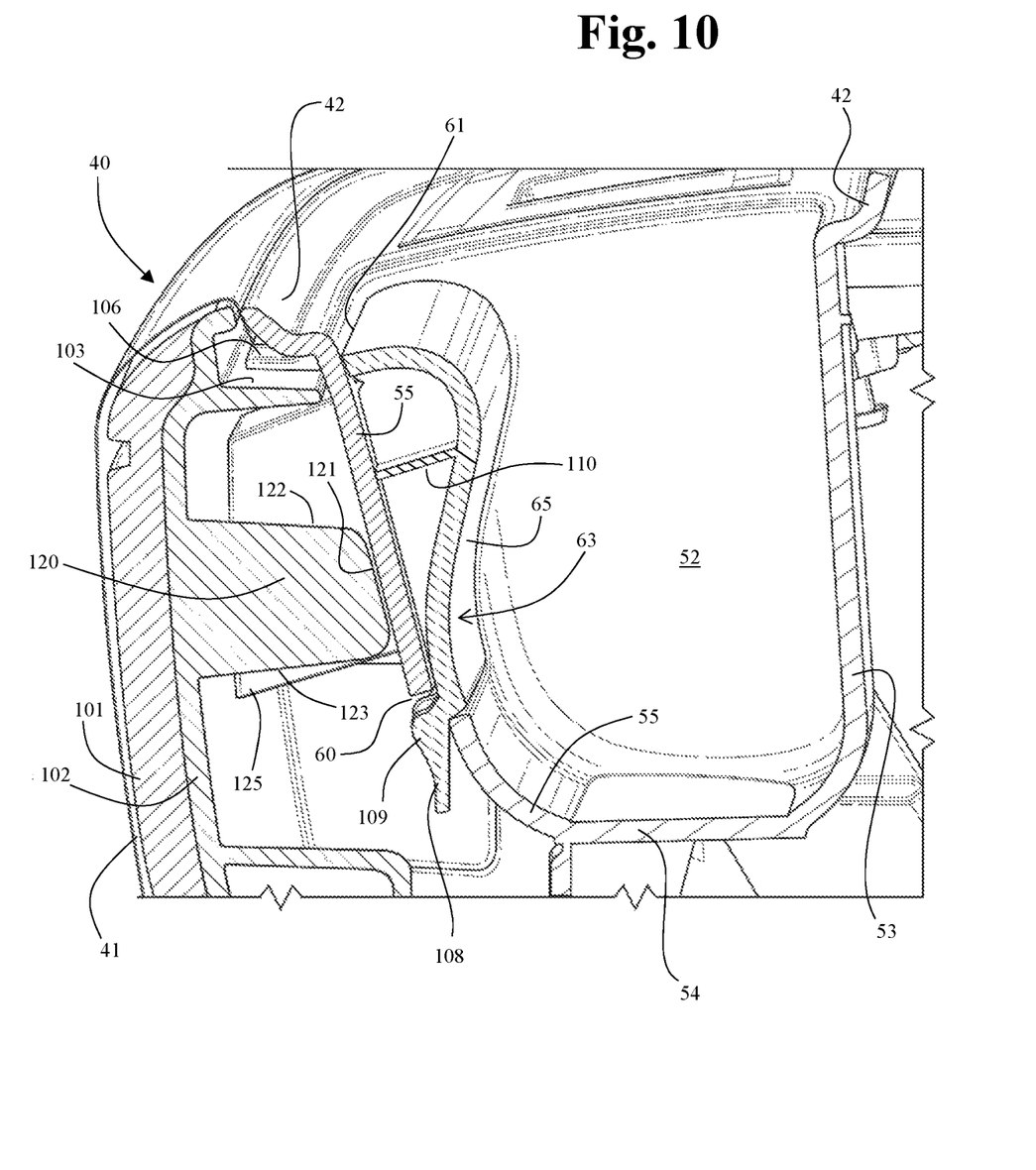
FIG. 10 is a cross-sectional schematic view of a third embodiment of a cover, in accordance with one or more embodiments of the disclosure.

FIG. 10 is a cross-sectional schematic view of a third embodiment of a cover 63 with armrest assembly 40, in accordance with one or more embodiments of the disclosure.

Figure 11:
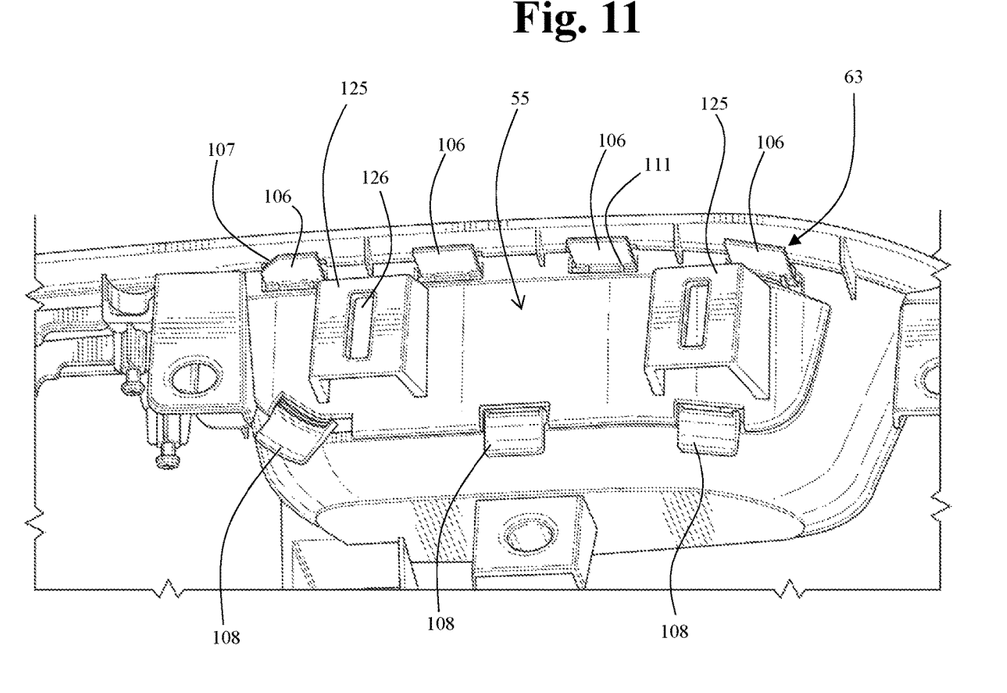
FIG. 11 is a perspective view of the third embodiment of the cover, of FIG. 10.

FIG. 11 is a perspective view of the cover 63 with armrest assembly 40 of FIG. 10, in accordance with one or more embodiments of the disclosure.

The armrest assembly 40 can include a panel 42. The panel 42 can include a pull pocket 52, as shown in FIG. 1. The pull pocket 52 can include an outboard panel 53 and an inboard panel 55. The pull pocket 52 may also include a lower panel 54. The cover 63 can be provided upon or adjacent to the inboard panel 55.

The panel 42 and the pull pocket 52 can include finished/textured surfaces. In addition to such finished/textured surfaces of panel 42 and the pull pocket 52, the armrest assembly 40 can further include a decorative panel 41 that is secured at one end to the panel 42. The decorative panel 41 can be a fabric panel, a leather panel, a wood panel, carbon fiber panel, etc.

The armrest assembly 40 can further include a cushion layer 101 and a substrate 102. The cushion layer 101 can be positioned as a layer underneath the decorative panel 41. The substrate 102 can be positioned as a layer underneath the cushion layer 101. The substrate 102 can be plastic, for example. Accordingly, the cushion layer 101 can be sandwiched between the decorative panel 41 and the substrate 102.

As shown in FIG. 10, the armrest assembly includes the cover 63. The cover 63 can include a cover panel 65. The cover 63 can provide an "island" within the pull pocket 52 and enhance touch and feel of an armrest of a vehicle door, such as when the vehicle door is being opened or closed.

The inboard panel 55 can include apertures, 60, 61. Aperture 61 can be located at an upper portion of the inboard panel 55. Aperture 60 can be located at a lower portion of the inboard panel 55. As shown in FIGS. 10 and 11, the cover 63 includes a plurality of snaps 106 and a plurality of attachment elements 108. The snaps 106 and attachment elements 108 function to secure the cover panel 65 to the interior of the pull pocket and, specifically, to the inboard panel 55. The snap 106 can be received into and "snap" into aperture 61 in the inboard panel 55. The attachment element 108 can be received into aperture 60 of the inboard panel 55. The attachment element 108 can be secured into the aperture 60 as a result of the relative geometries of the attachment element 108 and the aperture 60 and/or inboard panel 55. The attachment element 108 can include a bulbous portion 109. The bulbous portion 109 can assist in securing the attachment element 108 within aperture 60.

As is shown in FIG. 10, the substrate 102 can include a flange 103. The flange 103 can run, in a horizontal manner, along a length of the pull pocket 52. The flange 103 can serve to support and position the inboard panel 55, such as when force is applied to the cover panel 65 by an occupant of the vehicle. Such force might be applied when the occupant of the vehicle is either pulling or grabbing the armrest, for example.

The substrate 102 can also include a standoff 120. The standoff 120 can also serve to support and position the inboard panel 55, such as when force is applied to the cover panel 65. The standoff can extend along a length of the pull pocket 52 and/or extend along a length of the cover 63. The standoff 120 can include an abutment wall 121. As shown in FIG. 10, the abutment wall 121 can be a portion of the standoff 120 that engages and supports the inboard panel 55. The standoff 120 can also include a top surface 122 and a lower surface 123. Accordingly, the standoff 120 can be or include a three-dimensional flange, ridge or protuberance that extends from the substrate 102 and runs along the inboard side, of the vehicle, of the pull pocket 52 such that the abutment wall 121 provides a planar surface that opposes the surface of the inboard panel 55 that faces toward the standoff 120. As a result of the abutment wall 121 facing the inboard panel 55, the standoff 120 can function to limit deflection of the cover panel 65 and/or limit deflection of the inboard panel 55.

The cover 63 can also include a reinforcing web 110. The reinforcing web 110 can extend from and along an interior surface of the cover panel 65. The reinforcing web 110 can have any appropriate three-dimensional shape, such as but not limited to an elongated rectangular cube as shown in FIG. 10. The reinforcing web 110 can extend between the cover panel 65 and the inboard panel 55. The reinforcing web 110 can function a limit deflection of the cover panel 65. Also, the reinforcing web 110 can serve to transmit forces that are exerted on the cover panel 65 to the inboard panel 55, and such forces can in turn be transferred to the standoff 120 and/or flange 103. The reinforcing web 110 is not limited to the single structure or panel as shown in FIG. 10, but may include additional structure or panels.

As shown in FIG. 11, the cover 63 can include a plurality of snaps 106. The snaps 106 can be provided at an upper portion or edge of the cover panel 65. One of the snaps 106 can include a bevel 107 that can assist in assembly and positioning of the cover 65. The snaps 106 can include reinforcing flanges 111, as shown in FIG. 11. As shown in FIG. 11, the cover 63 includes four snaps 106. However, more or less snaps can be provided.

The cover 63 can include a plurality of attachment elements 108. The attachment elements 108 can be provided at a lower portion or edge of the cover panel 65. As shown in FIG. 11, the cover 63 includes three attachment elements 108. However, more or less attachment elements 108 can be provided.

The inboard panel 55 can include an attachment structure 125 to connect the inboard panel 55 to the substrate 102 or other supporting structure or surface. The supporting structure 125 can be U-shaped in cross-section with the leg ends of the U-shape attached to an inboard surface of the inboard panel 55. The supporting structure 125 can include an aperture 126 to house a fastener, which serves to connect the attachment structure 125 into the substrate 102 or other supporting structure or surface.

It is appreciated that the various components of embodiments of the disclosure can be made from any of a variety of materials including, for example, metal, plastic, plastic resin, nylon, composite material, leather, and/or rubber, for example, or any other material as may be desired.

A variety of production techniques can be used to make the apparatuses as described herein. For example, suitable casting and/or injection molding and other molding techniques and other manufacturing techniques might be utilized. Also, the various components of the apparatuses can be integrally formed, as may be desired, in particular when using casting or molding construction techniques.

The various apparatuses and components of the apparatuses, as described herein, may be provided in various sizes, shapes, and/or dimensions, as desired.

It will be appreciated that features, elements and/or characteristics described with respect to one embodiment of the disclosure can be variously used with other embodiments of the disclosure as can be desired.

While the subject matter has been described in detail with reference to exemplary embodiments thereof, it will be apparent to one skilled in the art that various changes can be made, and equivalents employed, without departing from the scope of the disclosure.

The cover, including the cover panel, may be positioned and configured to attach to the switch panel or panel in such manner that a portion of the switch panel remains exposed above the cover panel. Additionally, portions of the switch panel may be exposed on front and rear sides of the cover panel, as well as below the cover panel. As a result, the cover panel may constitute a touch surface "island" on the switch panel. More specifically, the cover panel may constitute a touch surface island on an inboard surface of the pull pocket of the switch panel.

In at least some embodiments of the invention, the cover may include a single snap. In the situation that the cover includes only a single snap, it may be desirable that the snap be in the form of a flange that extends along a length of an upper edge of the cover panel. Such arrangement may be provided to afford stability to the cover panel. On the other hand, other embodiments of the invention may include a plurality of snaps attached to the cover panel. For example, such plurality of snap assemblies may be attached along an upper edge of the cover panel. In a situation of the arrangement having a plurality of snap assemblies, the body portion and/or the guide extension, which extends from the body portion, may take on more of the form of a "prong" versus the "flange". Stability may be provided by the plurality of snap assemblies. The particular location of attachment of the one or more snap assemblies, upon the cover panel, may be varied as desired. Relatedly, location of attachment of the one or more attachment assemblies, upon the cover panel, may be varied as desired.

For example, embodiments are disclosed above in which the cover 63 or portions thereof is constructed of a single or unitary piece. However, embodiments are intended to include or otherwise cover a cover that includes or is constructed of multiple pieces. For example, the multiple pieces of assembly can be injection molded in pieces and then connected together such as by heat bonding or adhesive, for example.

For example, embodiments are disclosed above in which the cover 63 includes a specific shape, geometry, or construction. It is appreciated that shape and structure of components described herein may vary between different types of door structure. Accordingly, exemplary embodiments are also intended to include or otherwise cover assemblies that include variations in shape, geometry, or construction as dependent on door structure with which the cover 63 is intended to be utilized.

What is claimed is:

1. An armrest assembly for an armrest of a vehicle door, the armrest assembly comprising:
    a panel including an upper exterior surface, a pull pocket extending from and recessed below the upper exterior surface, a first engagement aperture in the pull pocket, a second engagement aperture in the pull pocket; and
    a cover panel possessing a height and width to provide a touch surface of the armrest, the cover panel including an interior surface and an exterior surface, the exterior surface providing the touch surface for an occupant to exert force on the vehicle door, the cover panel located in the pull pocket and exposing the upper exterior surface of the panel, the cover panel further including,
        a snap including a snap element engaging the first engagement aperture, the snap extending from a first end of the cover panel, and
        an attachment element engaging the second engagement aperture, the attachment element extending from a second end of the cover panel.

2. The armrest assembly of claim 1, wherein the pull pocket includes a first panel having a panel surface that surrounds the cover panel such that the cover panel provides a touch surface island of the panel.

3. The armrest assembly of claim 1, wherein the snap is positioned above the attachment element.

4. The armrest assembly of claim 1, wherein the snap includes a body portion and a guide extension, and the body portion connected to the cover panel, and the guide extension extending from the body portion.

5. The armrest assembly of claim 4, wherein the snap element includes an engagement channel configured to engage an edge of the pull pocket extending along the first engagement aperture.

6. The armrest assembly of claim 5, wherein the engagement channel extends transverse to the body portion, across a top of the body portion.

7. The armrest assembly of claim 1, wherein the snap includes at least one flange extending along a length of the cover panel, and each at least one flange includes:
    a body portion, and
    a guide extension, the body portion connected to the cover panel and the guide extension extending from the body portion.

8. The armrest assembly of claim 7, wherein each snap includes an engagement channel, and the engagement channel is provided in the body portion.

9. The armrest assembly of claim 8, wherein the at least one flange includes a plurality of flanges, and the plurality of flanges are connected in sequence along an upper edge of the cover panel.

10. The armrest assembly of claim 1, wherein the snap includes an engagement channel configured to engage an edge of the pull pocket extending along the first engagement aperture.

11. The armrest assembly of claim 1, wherein the first engagement aperture defines a hole or slot, and the snap is configured to engage an edge of the pull pocket extending along the hole or slot.

12. The armrest assembly of claim 1, wherein the second engagement aperture defines a hole or slot, and the attachment element is configured to engage an edge of the pull pocket extending along the hole or slot.

13. The armrest assembly of claim 1, wherein the cover panel defines a cross-section including both a convex portion and a concave portion.

14. The armrest assembly of claim 13, wherein the exterior surface of the cover panel is provided with the convex portion and the concave portion, and the convex portion is positioned above the concave portion.

15. A door assembly for a vehicle disposed in an opening of the vehicle, the door assembly comprising:
    an inner door panel;
    an outer door panel connected to the inner panel;
    a panel connected to the inner door panel, the panel including an upper exterior surface, a pull pocket extending from and recessed below the upper exterior surface, a first engagement aperture in the pull pocket, a second engagement aperture in the pull pocket, and a switch spaced away from the pull pocket; and
    a cover panel possessing a height and width to provide a touch surface of the armrest, the cover panel including an interior surface and an exterior surface, the exterior surface providing the touch surface for an occupant to exert force on the vehicle door, the cover panel located in the pull pocket and exposing the upper exterior surface of the panel, the cover panel further including, a snap including a snap element engaging the first engagement aperture, the snap extending from a first end of the cover panel, and an attachment element engaging the second engagement aperture, the attachment element extending from a second end of the cover panel.

16. The door assembly of claim 15, wherein the snap includes a body portion and a guide extension, the body portion connected to the cover panel, the guide extension extending from the body portion, and the snap element includes an engagement channel located in the body portion configured to engage the first engagement aperture.

17. The door assembly of claim 16, wherein the pull pocket includes a first panel, the first engagement aperture formed in the first panel, the first panel including a first edge that extends along the first engagement aperture, the cover panel terminating at a lower edge, and the attachment element including a flange extending from the interior surface of the cover panel and away from the lower edge of the cover panel such that the first edge is sandwiched between the flange and the lower edge.

18. A vehicle comprising:

a vehicle door configured to selectively open and close an opening of the vehicle, the vehicle door including an outer door panel, an inner door panel connected to the outer door panel, and a door lining connected to the inner door panel; and an armrest assembly connected to and extending from the door lining, and including, a panel including an upper exterior surface, a pull pocket extending from and recessed below the upper exterior surface, a first engagement aperture in the pull pocket, a second engagement aperture in the pull pocket, and a switch spaced away from the pull pocket, and a cover panel possessing a height and width to provide a touch surface of the armrest, the cover panel including an interior surface and an exterior surface, the exterior surface providing the touch surface for an occupant to exert force on the vehicle door, the cover panel located in the pull pocket and exposing the upper exterior surface of the panel, the cover panel further including, a snap engaging with the first engagement aperture, the snap attached to the interior surface of the cover panel, and an attachment element engaging with the second engagement aperture, the attachment element attached to the interior surface of the cover panel.

19. The vehicle of claim 18, wherein the cover panel includes a lower edge and an upper edge, and the touch surface extends from the lower edge to the upper edge, the snap extending from the cover panel at a location adjacent to the upper edge, and extending from the upper edge in a first direction, and the attachment element extending from the cover panel at a location adjacent to the lower edge, and extending from the lower edge in a second direction that is different from the first direction.

20. The vehicle of claim 18, wherein the snap includes a body portion and a guide extension, the body portion connected to the cover panel, and the guide extension extending from the body portion, and the snap element includes an engagement channel located in the body portion configured to engage the first engagement aperture.

* * * * *